May 14, 1940.　　　　W. F. ROUSE　　　　2,200,898
LOADER FOR GRAIN OR THE LIKE
Filed Aug. 14, 1939　　　4 Sheets-Sheet 1

INVENTOR.
W. F. ROUSE
BY M. Talbert Dick
ATTORNEY.

May 14, 1940.   W. F. ROUSE   2,200,898
LOADER FOR GRAIN OR THE LIKE
Filed Aug. 14, 1939   4 Sheets-Sheet 2

INVENTOR.
W. F. Rouse
BY
M. Talbert Dick
ATTORNEY.

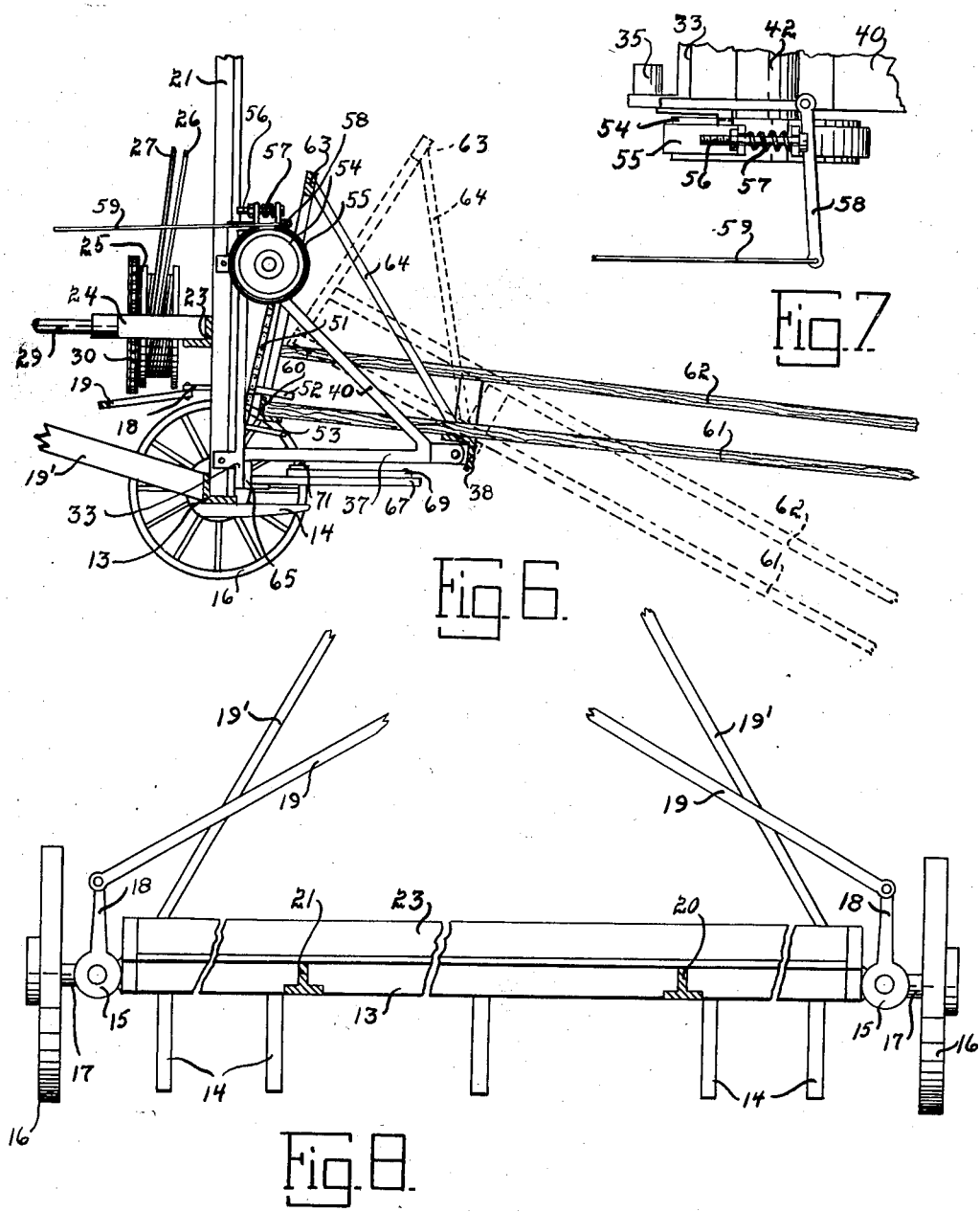

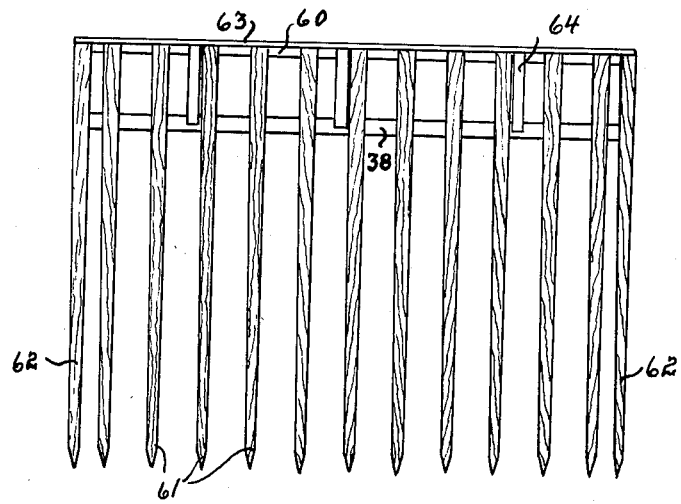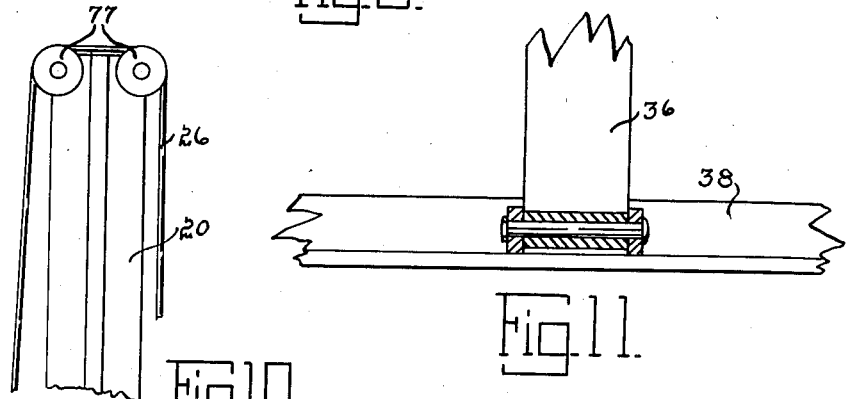

Patented May 14, 1940

2,200,898

UNITED STATES PATENT OFFICE 2,200,898

LOADER FOR GRAIN OR THE LIKE

Wallace F. Rouse, Palo Alto County, Iowa

Application August 14, 1939, Serial No. 290,045

4 Claims. (Cl. 214—113)

The principal object of this invention is to provide a mechanism which may be secured forward of a tractor for picking up shocks and bundles of grain in the field and loading them into a wagon or the like.

A further object of my invention is to provide a loader for grain or the like which will pick up shocks or bundles of grain, lift the shocks or bundles to a considerable height and permit the shocks and bundles to be deposited into a suitable storage place.

A further object of this invention is to provide a loader for grain or the like which may be powered from the power take-off of the tractor for raising and depositing the shocks or bundles of grain and one which is highly mobile and easily maneuverable.

A still further object of my invention is to provide a loader for grain or the like that is of rigid structure and which will permit the lifting, loading and gathering of shocks or the like on a field.

A still further object of this invention is to provide a loader for grain or the like that is economical in manufacture and durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 6 is an enlarged side cross sectional view of my device and is taken on the line 6—6 of Fig. 2.

Fig. 7 is a top elevational view of a portion of the device showing the brake mechanism for holding the teeth in their normal position.

Fig. 8 is an enlarged top cross sectional view of the chassis and supporting elements of my device.

Fig. 9 is a top elevational view of the tooth supporting element with the teeth attached thereto.

Fig. 10 is an enlarged rear elevational view of the top of one of the vertical guide members showing the method of securing the pulley wheels thereto.

Fig. 11 is an enlarged bottom sectional view of a portion of my loader showing the method of riveting the tooth supporting bar.

Fig. 12 is an enlarged cross sectional view of the lower portion of the device showing the position of the sprocket wheels for controlling the movement of the teeth or tines.

Figure 1:
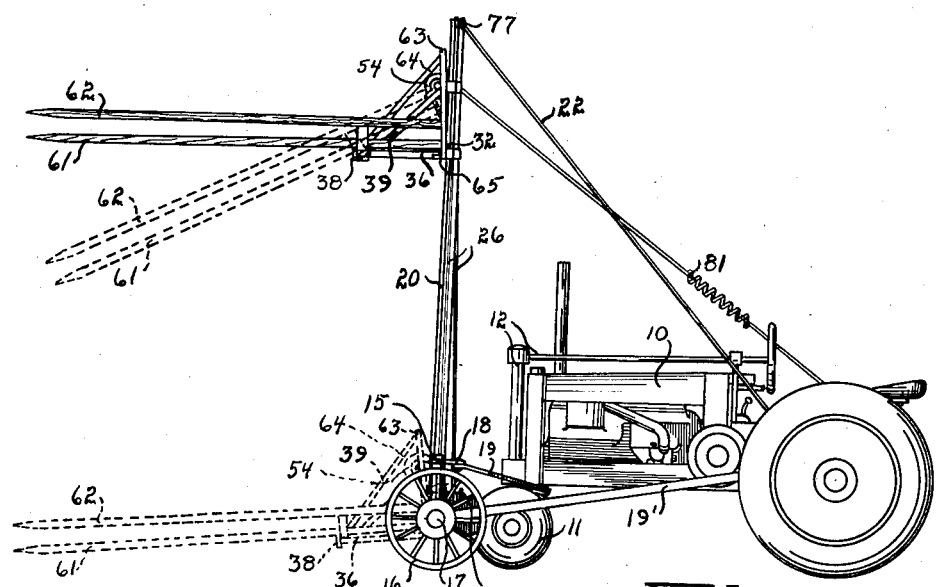
Fig. 1 is a side elevational view of my device ready for use and secured to a tractor.
Figure 2:
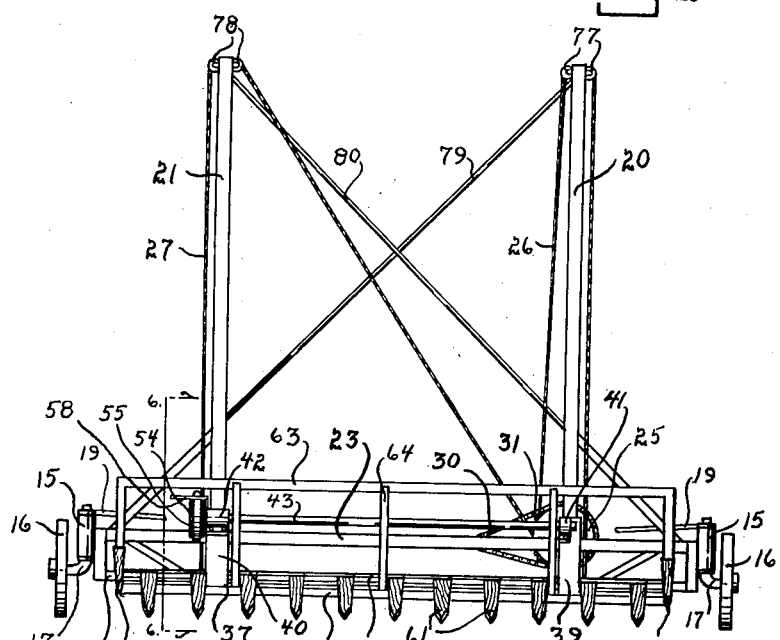
Fig. 2 is a front elevational view of my device not secured to a tractor.

One of the most tedious jobs on a farm or ranch is the gathering of bundles after they have been shocked. This requires considerable labor and is also hard on the individuals performing this labor inasmuch as most grain is irritating to the skin and the presence of chaff makes this an unpleasant task. Furthermore, when loading bundles of grain or the like into a high wagon, considerable physical effort is required and the job is a slow one.

I have overcome such disadvantages by providing a loader for grain or the like which will hereinafter be described.

Referring to the drawings, I have used the numeral 10 to indicate a tractor or the like having the steerable front wheels 11 controlled by the steering mechanism 12 and having a power takeoff on the front ends in the usual manner. It is to such a tractor that I attach my loader for grain or the like, which I will now describe.

The numeral 13 indicates the main supporting beam of my device, extending transversely to the direction of travel of the device and having secured thereto at spaced intervals the skids or runners 14, as shown in the drawings.

The numeral 15 indicates two bushings or journals rigidly secured to the end portions of the supporting beam 13.

The numerals 16 indicate wheels rotatably mounted on an axle 17, which in turn is rotatably journalled in the journals or sleeves 15. The numerals 18 indicate crank arms rigidly secured to the upper end of the axles or shafts 17 for the purpose of steering the wheels 16.

I have used the numerals 19 to indicate two arms, each having one of their ends pivotally secured to the rearward ends of th ecrank arms 18 and having their other ends secured to the steering mechanism 12 of the tractor 10. Thus, the wheels 16 of the device are steered at the same time and in the same direction as the wheels 11 of the tractor.

The numerals 19' indicate two brace rods having their forward ends secured to the beam 13 and their rearward ends rigidly secured to the tractor. The numerals 20 and 21 indicate two upright spaced-apart T-irons having their lower ends rigidly secured to the beam 13, as shown in the drawings. The upper ends of these T-irons or guide bars are secured to the tractor by means of the stringer 22, as shown in Fig. 1 of the drawings.

Figure 3:
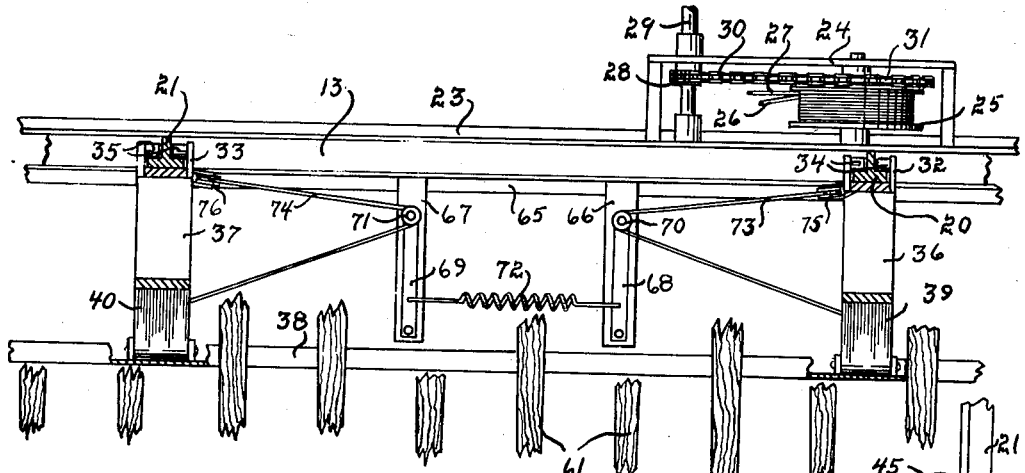
Fig. 3 is an enlarged top cross sectional view of a portion of my device showing the counterbalancing mechanism for returning the teeth to a normal position.
Figure 4:
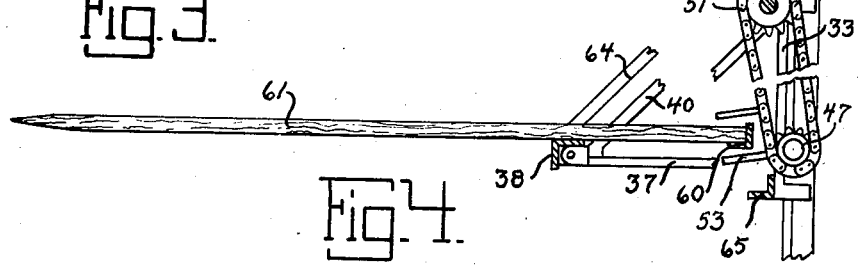
Fig. 4 is an enlarged side cross sectional view of a portion of my device more fully illustrating its structure.

The numeral 23 indicates a cross bar rigidly secured to the rearward edges of the vertical beams 20 and 21 and having its end portions rigidly secured to the beam 13 for providing a rigid base member. Rotatably held between this bar 23 and an auxiliary frame 24 is a cable drum 25 having thereon the double cables 26 and 27. The numeral 28 designates a sprocket gear secured to a shaft and rotatably mounted between the frame and the beam 23, as shown in Fig. 3. The shaft to which this sprocket gear 28 is secured, I have designated by the numeral 29 and this shaft is normally in operative engagement with the power take-off of the tractor 10.

The numeral 30 indicates a pan operatively engaging the sprocket 28 and the sprocket gear 31 which in turn is secured to the drum 25. Thus, when the shaft 29 is rotated by the power take-off of the tractor, the drum 25 is rotated, thereby winding or unwinding the cables 26 or 27 onto or off of the drum 25.

I have used the numerals 32 and 33 to designate two channel members slidably engaging the uprights 20 and 21 and held in constant engagement therewith by means of the rollers 34 and 35 respectively. Secured to each of these channel members 32 and 33 are the forwardly extending plate members 36 and 37 respectively.

Figure 5:
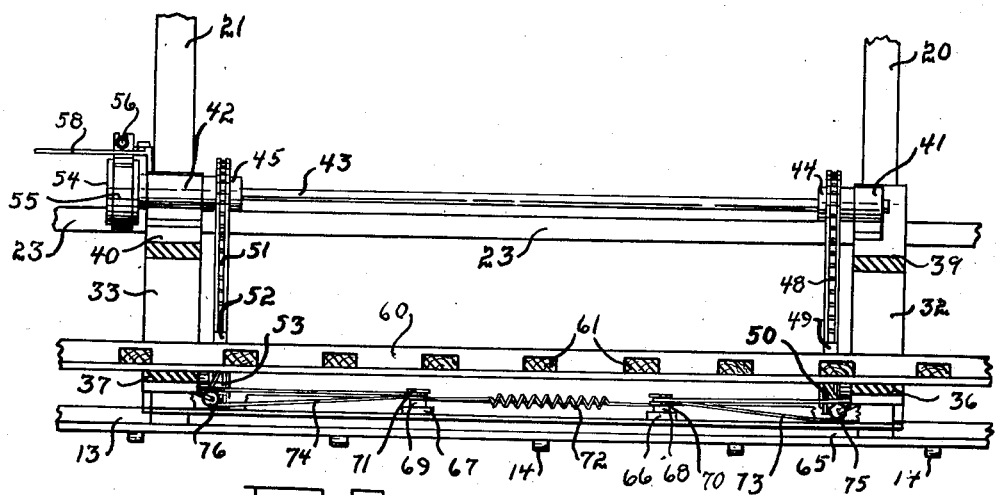
Fig. 5 is an enlarged front cross sectional view of a portion of my loader for grain or the like with portions broken away to more clearly illustrate the method of operating the same.

The numeral 38 indicates an ange iron pivotally secured to the forward ends of the plates 36 and 37, as shown in Fig. 3 of the drawings. The numerals 39 and 40 indicate two brace members extending upwardly and rearwardly from the forward portion of the plates 36 and 37, respectively. The numerals 41 and 42 indicate two bearing housings formed on the brace members 39 and 40 respectively and having rotatably mounted therein the elongated shaft 43. Rigidly secured to the shaft 43 are the sprocket gears 44 and 45. These sprocket gears are placed adjacent the bearing members 41 and 42 respectively, as shown in Fig. 5 of the drawings.

The numerals 46 and 47 indicate two sprocket wheels rotatably secured to the lower end portions of the channel members 32 and 33 respectively. I have used the numeral 48 to indicate a chain operatively embracing the sprocket gears 44 and 46 and having therein the outwardly extending engaging lugs 49 and 50, whose function will hereinafter be described.

The numeral 51 designates a similar chain operatively embracing the sprocket gears 45 and 47 and having thereon the outwardly extending engaging lugs 52 and 53, the function of which will be hereinafter described.

The numeral 54 indicates a brake drum rigidly secured to one end of the shaft 43 and having thereabout a brake band 55 which has one of its ends rigidly secured to the channel member 33. The numeral 56 indicates a rod placed through the upper end portions or ears formed on the brake band 55 and having a spring 57 coiled thereabout and between the ears of the brake band 55 for holding the brake band away from the drum 54. The numeral 58 designates an arm pivotally secured to the channel member 33 and extending outwardly adjacent one ear of the brake band 55.

The numeral 59 indicates a cable or the like secured to the outer end of the arm or lever 58 and having its other end extending rearwardly so that it may be controlled by the driver of the tractor 10 in any suitable manner.

I have used the numeral 60 to indicate an angle iron to which are secured a plurality of arms forwardly extending and pointed teeth 61. The numerals 62 indicate a tooth at either side of the teeth 61 and positioned above the plane of the teeth 61 for preventing bundles or shocks picked up by the teeth 61 from throwing out the sides of the device. It is upon the teeth 61 that the bundles are received as the device is moved over the ground. These teeth 61 have their rearward end portions secured to the angle iron 60 and are rigidly secured to the angle iron 35 which in turn is pivotally secured to the forwardly extending plate members 36 and 37.

The numeral 63 indicates a top rail spaced above the angle iron 60 and rigidly secured thereto. The numerals 64 designate a plurality of brace members extending between the angle iron 35 and the beam or top rail 60, as shown in Fig. 6 of the drawings. This top rail is positioned at such a height above the angle iron 60 as to not interfere with the operation of the shaft 43 or any of its attendant mechanism and is also positioned above the brace members 39 and 40.

Thus, the whole assembly of the angle irons 60, the teeth 61 and 62, the top rail 63 and the cross braces 64 are pivotally supported by the angle iron 35 and are capable of being tilted to the position shown by dotted lines in Figs. 1 and 6. It will here be noted that the engaging lugs 49 and 52 are normally positioned above the angle iron 60 while the engaging lugs 50 and 53 are below the angle iron 60. Thus, when the brake is on and the device is in position for gathering bundles, the engaging lugs 49 and 52 prevent the tooth assembly from tilting. After the device has been raised to the top or the position shown in Fig. 1, with the shocks on the teeth 61, the device may be transported or moved to the point of unloading.

As soon as the device is in position over the unloading point, such as a wagon, stack or like, pressure on the cable 59 is released, releasing the brake drum 54 from the band 55 at which time the weight of the bundles will pull downwardly on the ends of the tines or teeth 61, thereby causing the angle iron 60 to push upwardly on the engaging lugs 49 and 52 and permitting the thing to tilt by force of gravity. After the bundles have slid from the ends of the teeth 61, the device will return to its normal position due to its balancing spring mechanism which I will now describe.

The numeral 65 indicates an angle iron secured to the channel members 32 and 33, as shown in Fig. 3. The numerals 66 and 67 indicate two forwardly extending elements having their rearward ends rigidly secured to the angle iron 65. The numerals 68 and 69 indicate two bar members having their forward ends pivotally secured to the forward ends of the elements 66 and 67 respectively. The numerals 70 and 71 indicate pulley wheels rotatably mounted on the rearward ends of the levers or bars 68 and 69 respectively.

The numeral 72 indicates a tension spring having its ends secured to the levers or bars 68 and 69, for yieldingly holding them toward each other.

I have used the numerals 73 and 74 to indicate cables having one of their ends secured to the plates 36 and 37 respectively, extending around the pulleys 70 and 71 respectively, and, thence, around the pulleys 75 and 76 respectively and upwardly where they are secured to the angle iron 60. Thus, the spring 72 serves as a counterbalance, tending to hold the tines in their normal horizontal attitude.

The numerals 77 indicate pulley wheels rotatably mounted adjacent the top portion of the vertical member 20 over which the cable 26 passes from the drum 25 and the cable is then secured to the lower part of the frame supported by the channel members 32 and 33. The numeral 78 indicates similar pulley wheels secured to the top of the vertical member 21 and over which the cable 27 passes and thence, downwardly until it is secured to the frame supported by the channel member 33. Thus, when the drum is rotated and the cables 26 reeled therein, the completed assembly carried by the channel members 32 and 33 is raised upwardly and when the drum 25 is turned in the opposite direction, the frame assembly carrying the teeth is lowered on the uprights 20 and 21.

The numeral 79 indicates a brace rod extending from the upper portion of the vertical member 20 downwardly at an angle and has its other end secured to the member 21. Similarly, the numeral 80 indicates a brace rod having one of its ends secured to the upper end of the vertical iron 21 extending downwardly having its other end secured to the vertical member 20 for assuring the rigidity of the two members 20 and 21 relative to its supporting frame.

I have used the numeral 81 to indicate a spring or similar yielding means placed in conjunction with the cable or brake operating line 59. Obviously, anything may be used here to assure the brake being held tightly during the raising of the tooth assembly.

The practical operation of my device is as follows:

The part comprising the bar or angle iron 23, the angle iron 13, the brace rods 19, the skids 14 and the steering mechanism coupled together with the wheels 16, axle 17 and the wheel tractor bushing 15, will hereinafter be referred to as the chassis. The portion comprising the channel irons 32 and 33 with their attendant roller assemblies 34 and 35, the horizontal plates 36 and 37, the brace members 39 and 40 and the counterbalance supporting bars 66 and 67 will hereinafter be referred to as the carrier. The portion comprising the teeth 61 and 62, the angle iron 60, the bar 63, the brace member 64 and the pivoted bar member 35 will hereinafter be referred to as the tooth, rack or bundle pick-up assembly.

The device is suitably secured and braced relative to a tractor through the medium of the brace rods 19' and 22. The shaft 29 is secured to the power take-off of the tractor 10 and the steering arms or rods 19 and secured to the steering mechanism of the tractor 10 and the device is ready for use. The device will be in the position shown by the lower set of dotted lines in Fig. 1 and also shown in Fig. 6. The drive of the tractor then moves the tractor over the field so that the teeth 61 pick up the shocks and bundles of grain. These shocks and bundles will then rest on top of the teeth 61 and be prevented from falling from the sides of the tooth assembly by the teeth 62.

The drive then places a tension on the cable 59, clamping the brake band 56 onto the brake drum 55 through the medium of the pivoted arm 58. This prevents the shaft 43 from rotating and holds the two lugs 49 and 52 in position, preventing the tooth assembly from pivoting relative to the carrier. The driver then operates the power take-off of the tractor, winding the cables 26 and 27 onto the drum 25 and causing the entire carrier and tooth assembly to rise on the vertical beams 20 and 21 to the position shown in Fig. 1 of the drawings. The tractor is then guided to a position over the stack, wagon or other point of depositation and it will here be noted that the maneuvering of the entire device is made easier due to the fact that the wheels 15 may be steered simultaneously with the wheels of the tractor 10. When the point of depositation has been reached, it is merely necessary for the operator of the tractor to release the pressure on the cable 59 which, in turn, releases the brake. The weight of the bundles on the teeth 61 will then cause the tooth assembly to pivot on the pivot points of the carrier to the position shown by the upper set of dotted lines in Fig. 1 or to a relative position indicated by dotted lines in Fig. 6. This action causes the bar 60 to push the lugs 49 and 52 upwardly causing the chain to travel about the two sets of sprocket gears 44 and 46 and 45 and 47 respectively. As soon as the bundles or shocks of grain have slipped from the ends of the teeth 61, the counterbalance mechanism functions the spring 72 by its tension, holds the arms 68 and 69 toward each other, thereby shortening the cables 73 and 74 whose end portions are connected to the bar or angle iron 60, causing the device to return to the horizontal position. On an uneven ground or points where either one of the wheels 16 would sink into a hole in the ground or a furrow, the skids 14 will support the device until the wheel has again reached an operating level.

Thus, it will be seen that I have provided a loader for shocked grain or the like which fulfills all of my objects and brings many more obvious advantages. My device is rigid, is highly maneuverable so that it may be directed toward the shocks or bundles of grain, may be turned on a comparatively short radius, will adequately support a large amount of shocked grain and provides a speedy method of gathering and loading this type of farm product.

Some changes may be made in the construction and arrangement of my improved loader without departing from the real spirit and purpose of my invention, and it is my intention to cover by my claims any modified forms of structure or use of mechanical equivalents which may be reasonably included within their scope.

I claim:

1. In a device of the class described, a steerable chassis designed to be secured to a driving mechanism or the like, two spaced-apart track members rigidly secured to said chassis and extending upwardly, a carrier element slidably mounted on said track bars, a means for manually raising said carrier on said track bars, a tooth rack pivotally secured to said carrier and having thereon a plurality of forwardly extending elongated tooth members, a shaft secured and rotatably mounted on said carrier, a sprocket gear secured to said shaft, a second sprocket gear spaced from said first mentioned sprocket gear and secured to said carrier, a sprocket chain operatively connecting said first and said second mentioned sprocket gears, spaced apart lugs on said chain capable of contacting the rearward end of said tooth rack for controlling its pivotal action, and a manually operated brake mechanism on said shaft for limiting the movement of said chain, said lugs and said tooth rack at times.

2. In a loader for grain or the like, a chassis designed to be secured to a driving mechanism or the like, a track member rigidly secured to said chassis and extending upwardly, a carrier element slidably mounted on said track member, a means for raising said carrier on said track member, a toothed rack pivotally secured to said carrier, a shaft secured to and rotatably mounted on said carrier, a sprocket gear on said shaft, a second sprocket gear spaced apart from said first mentioned sprocket gear and operatively secured to said carrier, a chain operatively connecting said first and said second mentioned sprocket gears, lugs on said chain capable of contacting the rearward end of said toothed rack for controlling its pivotal action, and a brake mechanism on said shaft and said sprocket gear for controlling the pivoting action of said toothed rack at times.

3. In a device of the class described, a steerable chassis designed to be secured to a driving mechanism or the like, two spaced apart track members rigidly secured to said chassis and extending upwardly, a carrier element slidably mounted on said track bars, a means for manually raising said carrier on said track bars, a tooth rack pivotally secured to said carrier and having thereon a plurality of forwardly extending elongated tooth members, a counterbalance mechanism comprising, two spaced apart bar members, each having one of their ends pivotally secured to said carrier element, a pulley wheel on the other end of each of said bar members, a tension spring imposed between said bar members, cables each having one of their ends secured to said carrier extending around one of the pulleys respectively and having the other end secured to the rearward end of said tooth rack to the rear of its pivot point for counterbalancing said tooth rack.

4. In a device of the class described, a steerable chassis designed to be secured to a driving mechanism or the like, two spaced apart track members rigidly secured to said chassis and extending upwardly, a carrier element slidably mounted on said track bars, a means for manually raising said carrier on said track bars, a tooth rack pivotally secured to said carrier and having thereon a plurality of forwardly extending elongated tooth members, a shaft secured and rotatably mounted on said carrier, a sprocket gear secured to said shaft, a second sprocket gear spaced from said first mentioned sprocket gear and secured to said carrier, a sprocket chain operatively connecting said first and said second mentioned sprocket gears, spaced apart lugs on said chain capable of contacting the rearward end of said tooth rack for controlling its pivotal action, and a means for limiting the movement of said chain, said lugs and said tooth rack at times.

WALLACE F. ROUSE.